(12) United States Patent
Klug et al.

(10) Patent No.: US 11,216,666 B2
(45) Date of Patent: Jan. 4, 2022

(54) UNDERSTANDING NORMALITY OF AN ENVIRONMENT USING SEMANTIC INFORMATION FROM IMAGES

(71) Applicant: FUJIFILM Business Innovation Corp., Tokyo (JP)

(72) Inventors: Nikolas Hans-Friedrich Klug, Friedberg (DE); Miteshkumar Patel, San Mateo, CA (US); David Ayman Shamma, San Francisco, CA (US); Xiaojing Zhang, Tokyo (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 88 days.

(21) Appl. No.: 16/711,314

(22) Filed: Dec. 11, 2019

(65) Prior Publication Data
US 2021/0182556 A1 Jun. 17, 2021

(51) Int. Cl.
*G06K 9/00* (2006.01)
*G06T 7/194* (2017.01)

(52) U.S. Cl.
CPC ..... *G06K 9/00671* (2013.01); *G06K 9/00684* (2013.01); *G06T 7/194* (2017.01)

(58) Field of Classification Search
USPC .......................... 382/103, 173, 180; 348/169
See application file for complete search history.

(56) References Cited

U.S. PATENT DOCUMENTS

| | | | |
|---|---|---|---|
| 7,613,668 B2 | 11/2009 | Höglund et al. | |
| 7,813,528 B2* | 10/2010 | Porikli | G06K 9/00771 382/103 |
| 8,107,678 B2* | 1/2012 | Feris | G06K 9/00771 382/103 |
| 8,675,917 B2* | 3/2014 | Brown | G06K 9/626 382/103 |
| 8,724,904 B2* | 5/2014 | Fujiki | B61L 23/048 382/195 |
| 8,848,053 B2* | 9/2014 | Scanlon | G06K 9/00771 348/143 |
| 9,020,190 B2* | 4/2015 | Fan | G06K 9/6277 382/103 |

(Continued)

FOREIGN PATENT DOCUMENTS

WO 2013/062738 A1 5/2013

OTHER PUBLICATIONS

Deng, J. et al. "ImageNet: A Large-Scale Hierarchical Image Database" In CVPR09, 2009; 8 pages.

(Continued)

*Primary Examiner* — Ishrat I Sherali
(74) *Attorney, Agent, or Firm* — Procopio, Cory, Hargreaves & Savitch LLP

(57) ABSTRACT

Example implementations described herein are directed to systems and methods for anomaly detection through using a segmentation process and an object detection process on images received through a camera system. The segmentation process and object detection process are then matched to detected additive anomalies (e.g., objects added to the environment) and subtractive anomalies (e.g., objects missing from the environment). Based on the type of anomaly detected as well as the underlying object, notifications can be dispatched to the user of the environment or the administrator of the system.

18 Claims, 12 Drawing Sheets

(56) References Cited

U.S. PATENT DOCUMENTS

| | | | |
|---|---|---|---|
| 9,245,207 B2* | 1/2016 | Zong | G06T 7/254 |
| 9,723,271 B2* | 8/2017 | Xu | H04N 7/188 |
| 10,212,397 B2* | 2/2019 | Zhang | G06K 9/00785 |
| 10,296,601 B2* | 5/2019 | Botea | G06K 9/00 |
| 10,628,683 B2* | 4/2020 | Doumbouya | G06K 9/00268 |
| 10,776,926 B2* | 9/2020 | Shrivastava | G06T 7/194 |
| 2008/0247599 A1* | 10/2008 | Porikli | G06K 9/00771 |
| | | | 382/103 |
| 2010/0165112 A1* | 7/2010 | Scanlon | H04N 19/17 |
| | | | 348/169 |
| 2013/0108102 A1* | 5/2013 | Brown | G06K 9/00369 |
| | | | 382/103 |
| 2014/0233793 A1* | 8/2014 | Zong | G06K 9/6277 |
| | | | 382/103 |
| 2017/0032514 A1* | 2/2017 | Zhang | G06K 9/00771 |
| 2018/0157939 A1* | 6/2018 | Butt | H04N 21/44 |
| 2020/0193166 A1* | 6/2020 | Russo | G06T 7/194 |

OTHER PUBLICATIONS

Farnoosh, A. et al. "DEEPPBM: Deep Probabilistic Background Model Estimation From Video Sequences" CoRR, 2019; 5 pages.

Khazai, S. et al. "Anomaly Detection in Hyperspectral Images Based on an Adaptive Support Vector Method" IEEE Geoscience and Remote Sensing Letters, Jul. 2011, pp. 646-650; vol. 8, No. 4.

Li, W. et al. "Anomaly Detection and Localization in Crowded Scenes" IEEE Transactions on Pattern Analysis and Machine Intelligence, Jan. 2014; pp. 18-32; vol. 36, No. 1.

Lin, T-Y. et al. "Microsoft COCO: Common Objects in Context", CoRR, 2014; 15 pages.

Matteoli, S. et al. "A Tutorial Overview of Anomaly Detection in Hyperspectral Images" IEEE A&E Systems Magazine, Jul. 2010; pp. 5-27; vol. 25, No. 7.

Ramachandran, A. et al. "Unsupervised deep learning system for local anomaly event detection in crowded scenes" Multimedia Tools and Applications, May 12, 2019; 21 pages.

Redmon, J. et al. "YOLOv3: An Incremental Improvement" CoRR, 2018; 6 pages.

Tarabalka, Y. et al. "Real-time anomaly detection in hyperspectral images using multivariate normal mixture models and GPU processing" J Real-Time Image Processing; 2009; pp. 287-300.

Wu, S. et al. "Chaotic Invariants of Lagrangian Particle Trajectories for Anomaly Detection in Crowded Scenes" 2010 IEEE Computer Society Conference on Computer Vision and Pattern Recognition, Jun. 2010; pp. 2054-2060.

Yuan, Y. et al. "Online Anomaly Detection in Crowd Scenes via Structure Analysis" IEEE Transactions on Cybernetics, Mar. 2015; pp. 562-575; vol. 45, No. 3.

Zhu, Y et al. "Motion-Aware Feature for Improved Video Anomaly Detection" CoRR, 2019; 12 pages.

Christiansen, P. et al. "DeepAnomaly: Combining background subtraction and deep learning for detecting obstacles and anomalies in an agricultural field" Sensors, Oct. 26, 2016; 22 pages.

Kim, et al. "A hybrid framework combining background subtraction and deep neural networks for rapid person detection" Journal Big Data (2018), 24 pages.

Tian, Y. et al. "Robust Detection of Abandoned and Removed Objects in Complex Surveillance Videos" IEEE Transactions on Systems, Man, and Cybernetics, Part C (Applications and Reviews), 2011, 13 pages.

\* cited by examiner

| System ID | Expected Objects | Schedule/Log | Anomaly Handling |
|---|---|---|---|
| System1 | SysOb1 | SysSch1 | AH1 |
| System2 | SysOb2 | SysSch2 | AH2 |
| System3 | SysOb3 | SysSch3 | AH3 |
| System4 | SysOb4 | SysSch4 | AH4 |
| System5 | SysOb5 | SysSch5 | AH5 |
| ... | | | |

FIG. 7(a)

| User ID | Time Entered/Scheduled | Contact Information |
|---|---|---|
| User1 | T1 | C1 |
| User2 | T2 | C2 |
| User3 | T3 | C3 |
| User1 | T4 | C1 |
| User5 | T5 | C5 |
| ... | | |

FIG. 7(b)

UNDERSTANDING NORMALITY OF AN ENVIRONMENT USING SEMANTIC INFORMATION FROM IMAGES

BACKGROUND

Field

The present disclosure is generally directed to object detection, and more specifically, to systems and methods for detecting anomalous or missing objects in an environment.

Related Art

The problem of detecting unknown and/or missing objects in a given environment provides several challenges. In various related art real world applications, monitoring changes in the environment is mostly conducted manually as it can be difficult for an automated system to determine whether changes in an environment are relevant or not. Such tasks are highly time consuming and thus expensive. An automated detection of anomalies can help drastically reduce manual effort in such tasks.

Such systems would need to be able to distinguish between objects that are common or expected in the given environment against objects that are anomalous or not expected in a given environment. In the related art, there have been systems that involve anomaly detection in hyperspectral images and anomaly detection in crowded scenes.

SUMMARY

Detecting anomalies in a given environment from images or videos still can be a challenging task, as it is hard to (a) detect previously unseen objects, (b) classify an object as anomalous or not and (c) detect if objects have gone missing. Hence, these tasks are still done under human observation. Automated detection of anomalies in a given environment can help to drastically reduce manual effort in surveillance and other object detection scenarios.

In example implementations described herein, there are two types of anomalies that are considered: Additive (an object has been added to the scene) and Subtractive (an object has been removed from the scene) anomalies. Example implementations described herein involve a multi-stage system that includes a combined object detection and foreground segmentation model which generates regions of interest, which can either be objects in the scene or areas previously occupied by objects. Such regions are subsequently classified as normal or anomalous.

Example implementations described herein can be implemented in static cameras as well as dynamically moving cameras that are associated with an environment location.

Aspects of the present disclosure include a computer program, storing instructions for executing a process, the instructions involving conducting anomaly detection on one or more images received from a system associated with an environment, based on a matching of one or more regions of interest extracted from foreground segmentation conducted on the one or more images with one or more detected objects extracted from object detection conducted on the one or more images; and for the anomaly detection indicating a detection of an anomaly, executing anomaly handling instructions based on the anomaly. The instructions can be stored in a non-transitory computer readable medium and configured to be executed by one or more processors.

Aspects of the present disclosure include a method involving conducting anomaly detection on one or more images received from a system associated with an environment, based on a matching of one or more regions of interest extracted from foreground segmentation conducted on the one or more images with one or more detected objects extracted from object detection conducted on the one or more images; and for the anomaly detection indicating a detection of an anomaly, executing anomaly handling instructions based on the anomaly. The instructions can be stored in a non-transitory computer readable medium and configured to be executed by one or more processors.

Aspects of the present disclosure include a system involving means for conducting anomaly detection on one or more images received from a system associated with an environment, based on a matching of one or more regions of interest extracted from foreground segmentation conducted on the one or more images with one or more detected objects extracted from object detection conducted on the one or more images; and for the anomaly detection indicating a detection of an anomaly, means for executing anomaly handling instructions based on the anomaly.

Aspects of the present disclosure involve a management apparatus, configured to manage a plurality of systems over a network, each of the plurality of systems associated with an environment, the management apparatus involving a processor, configured to conduct anomaly detection on one or more images received from a system from the plurality of systems, based on a matching of one or more regions of interest extracted from foreground segmentation conducted on the one or more images with one or more detected objects extracted from object detection conducted on the one or more images; and for the anomaly detection indicating a detection of an anomaly, execute anomaly handling instructions based on the anomaly.

Aspects of the present disclosure involve a system associated with an environment, the system involving a camera system; and a processor, configured to conduct anomaly detection on one or more images received from the camera system, based on a matching of one or more regions of interest extracted from foreground segmentation conducted on the one or more images with one or more detected objects extracted from object detection conducted on the one or more images; and for the anomaly detection indicating a detection of an anomaly, execute anomaly handling instructions based on the anomaly.

BRIEF DESCRIPTION OF DRAWINGS

FIGS. 7(a) to 7(c) illustrate examples of management information that can be utilized to facilitate the example implementations described herein.

DETAILED DESCRIPTION

Figure 1:
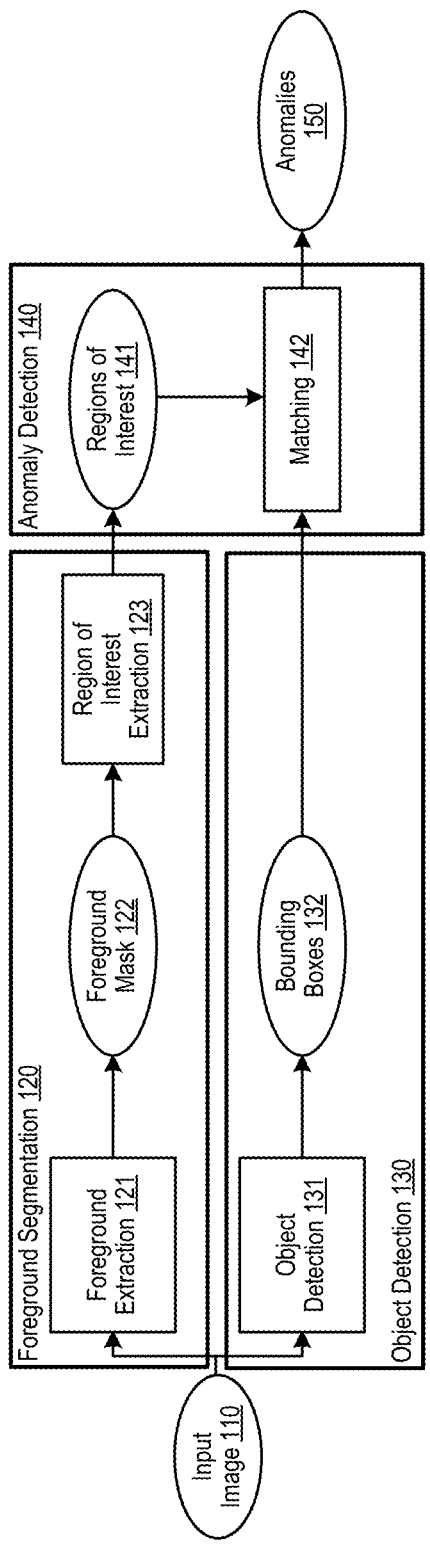
FIG. 1 illustrates an example overview of the system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

The problem of detecting unknown and/or missing objects in a given environment can be important to drive various enterprise applications, such as surveillance for unknown objects at large public venues, office/work environments, warehouses, and so on. In example implementations described herein, there is a system that is designed to automate the tedious process of manually surveying a given environment and looking for anomalies in the same. Example implementations involve a deep learning based system that is configured to observe both expected objects removed from an environment (e.g., objects stolen, missing, etc.) and objects that are not expected to be seen in a given environment (e.g., objects left behind by a user).

In example implementations described herein, there is a system configured for detecting and localizing anomalies in a given environment from images. Such anomalies can be broadly categorized as additive or subtractive anomalies. As will be described herein, an additive anomaly is a previously unknown object or an object not supposed to be in the given environment that entered the scene. For example, on a work desk, in which objects such as a monitor, keyboard or mouse are expected to be in the environment, a left-behind purse can be an additive anomaly. Similarly, for an image captured by an environment monitoring system (e.g., cycling through surveillance cameras in an environment), an example of an additive anomaly can be a chair forgotten in a hallway.

A subtractive anomaly is a region of the image previously occupied by an object which is supposed to be in the environment, but has gone missing. In the work desk example, a missing monitor is a subtractive anomaly. Similarly, for an environment monitoring robot for an indoor office space, a missing frame from a wall or light fixtures can be considered as a subtractive anomaly.

Example implementations described herein are also configured for providing additional information about the anomalies such as category classification, if such anomaly detection has occurred in the past. The example implementations can also be adjusted in real time to classify certain objects as not anomalous even though they were anomalous objects in the past.

Example implementations described herein involve a deep learning based system involving two main aspects: Object Detection and Foreground Segmentation. The outputs of each of these aspects are further utilized to detect known objects and anomalies in the environment.

FIG. 1 illustrates an example overview of the system, in accordance with an example implementation. An input image 110 is provided to foreground segmentation 120 and object detection 130 for processing, which will output regions of interest 141 and bounding boxes 132 to anomaly detection 140, which conducts matching 142 to identify anomalies 150.

The image 110 captured by the camera is used by the foreground segmentation model 120 to extract regions/areas which contain unknown objects through use of a foreground extraction 121 to produce a foreground mask 122. Examples of foreground extraction 121 functions can include, but is not limited to, a Variational Auto Encoder (VAE). The VAE is trained such that everything non-variant (e.g., areas in the image that do not change throughout the training images, such as stationary objects) is considered as background. From the output of the VAE and the original image 110, a binary foreground mask 122 is calculated by taking the difference between the two images. This foreground mask 122 is further used to extract bounding boxes containing Regions of Interest (ROIs) through an ROI extraction 123 function. These ROIs are generated for areas which show a sufficiently high density of foreground pixels and have sufficient difference between the foreground and the background image. The ROIs extracted using the above mentioned techniques provide areas/locations which are potential candidates for having an added object in the environment or a known object removed from the scene. The threshold can be set in accordance with the desired implementation.

For the detection of known objects, an object detection 131 function is utilized such as YOLOv3, which is a technique used for detecting and localizing objects in images. In example implementations, the YOLOv3 model is trained on objects that are expected to be found in the given environment, (e.g. monitor, keyboard, mouse, clocks, doors, frames, exit signs, lights for Environment Monitoring Robot (EMR), and so on). During inference, the model provides both locations (e.g., in the form of bounded boxes 132) and categories of the detected object for a given image. This information is further provided to the anomaly detection 140 function.

For the anomaly detection 140, the ROIs 141 detected by the foreground segmentation 120 function are matched 142 with the locations of objects detected by the object detection 142 function to classify unknown and known objects in a given environment. The ROIs 141 showing sufficient overlap with the location of objects (as defined by bounding boxes 132) are considered to be known objects whereas the ROIs 141 which do not have an overlapping counterpart are considered to be anomalies or unknown objects in the environment.

Figure 2:
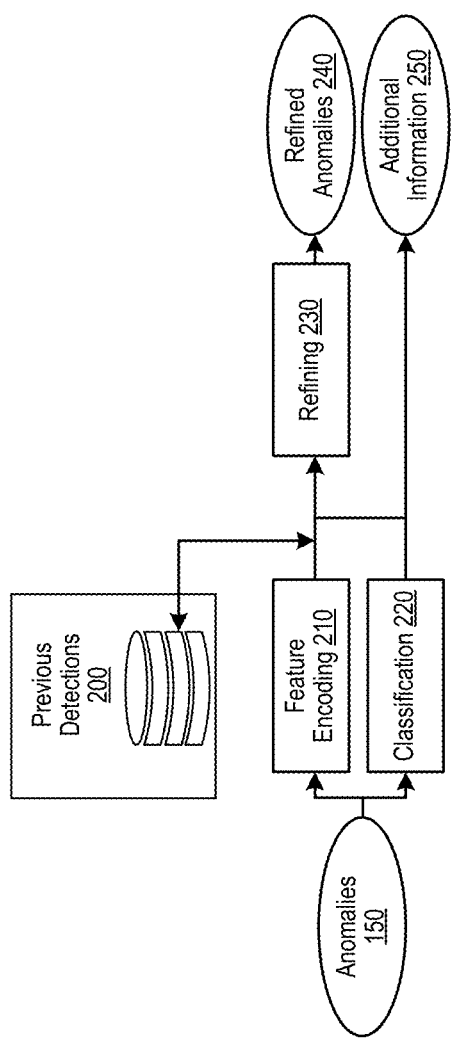
FIG. 2 illustrates an anomaly classification and adaption system, in accordance with an example implementation.

FIG. 2 illustrates an anomaly classification and adaption system, in accordance with an example implementation. Depending on the desired implementation, the detected anomalies 150 can be further classified 220 using any object classifier method in accordance with the desired implementation, such as ImageNet or COCO.

Further, example implementations can be configured to adapt to anomalies and declassify them as anomalous objects if they are repetitively seen in a scene by flagging such objects. Such example implementations can be facilitated by encoding the detected anomalous objects into feature vectors through conducting feature encoding 210 and storing those in a database that manages previous detections 200. Feature vectors of anomalous objects detected subsequently can be compared with the features vectors stored in this database 200 through a refining process 230. If a previously detected object (e.g., the corresponding feature vector) has been flagged as non-anomalous by the user/administrator, detected objects with similar feature vectors can be labelled as non-anomalous accordingly, the result of which is provided as refined anomalies 240. Further, if the underlying object can be identified based on the previous detections 200 (e.g., as based on labeling provided by a user/administrator, based on a library of feature vectors of identified objects as applied, etc.), the classification of the unknown object can be provided as additional information 250.

Example implementations thereby facilitate a deep learning based system that is configured to detect additive anomalies (e.g., unknown objects added in an environment), and subtractive anomalies (e.g., expected objects missing in a given environment). Example implementations can also localize objects in a scene and determine whether the object has been moved or removed from the previously location.

Example implementations can also classify the detected unknown objects from a pre-defined list of categories, for example COCO, ImageNet, etc. The classification of anomalous or non-anomalous objects can be adapted during the practical application.

Figure 3A:
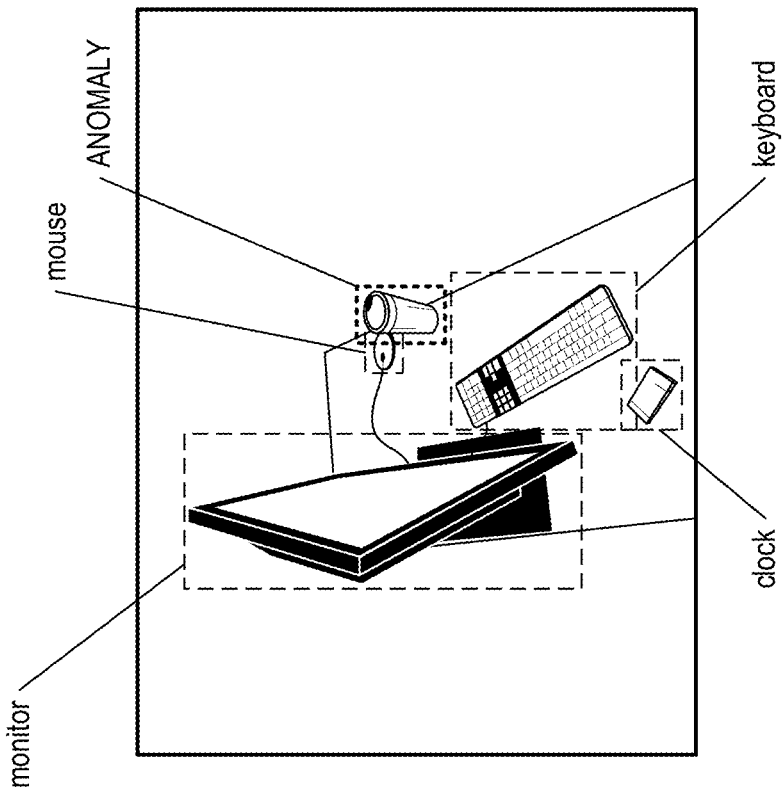
FIGS. 3(a) and 3(b) illustrate example detections, in accordance with an example implementation.
Figure 3A:
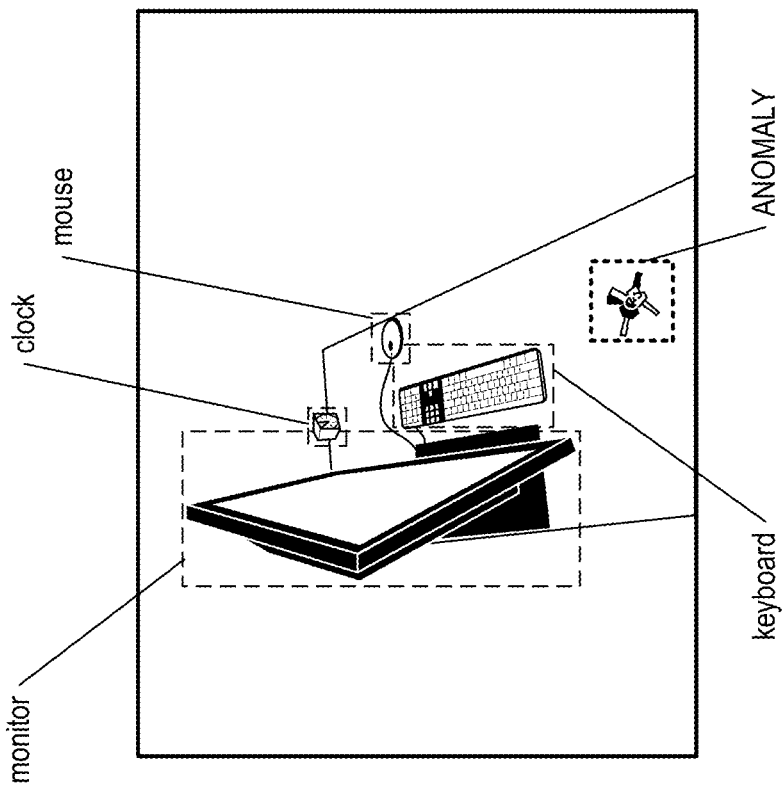
Figure 3B:
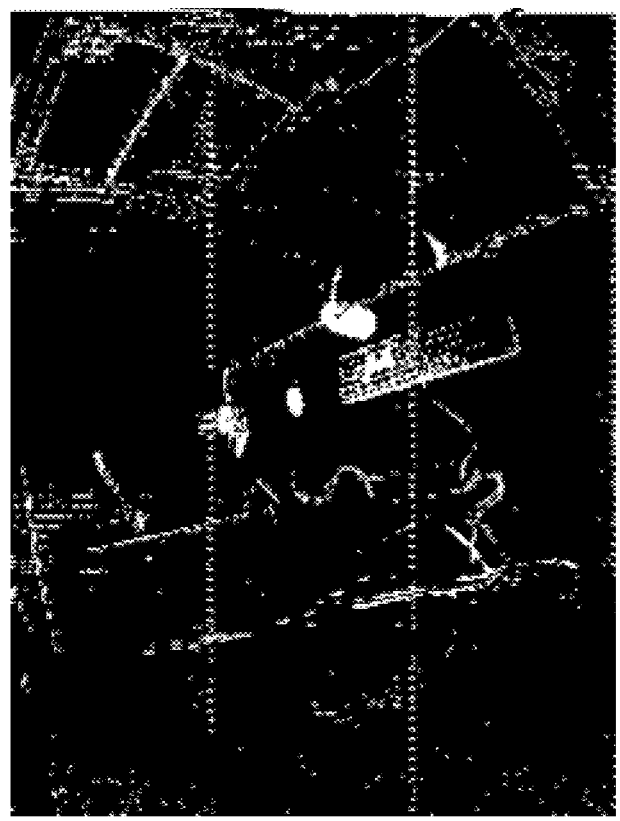

FIGS. 3(a) and 3(b) illustrate example detections, in accordance with an example implementation. In the example of FIG. 3(a), there are three moving items that are associated with the example environment (keyboard, mouse, clock) and one static item (monitor). Furthermore each image contains an example of an additive anomaly of some type (e.g., purse, pen, bottle, keys etc.). FIG. 3(b) illustrates an example of the foreground mask 122 for the environment, in accordance with an example implementation.

Figure 4A:
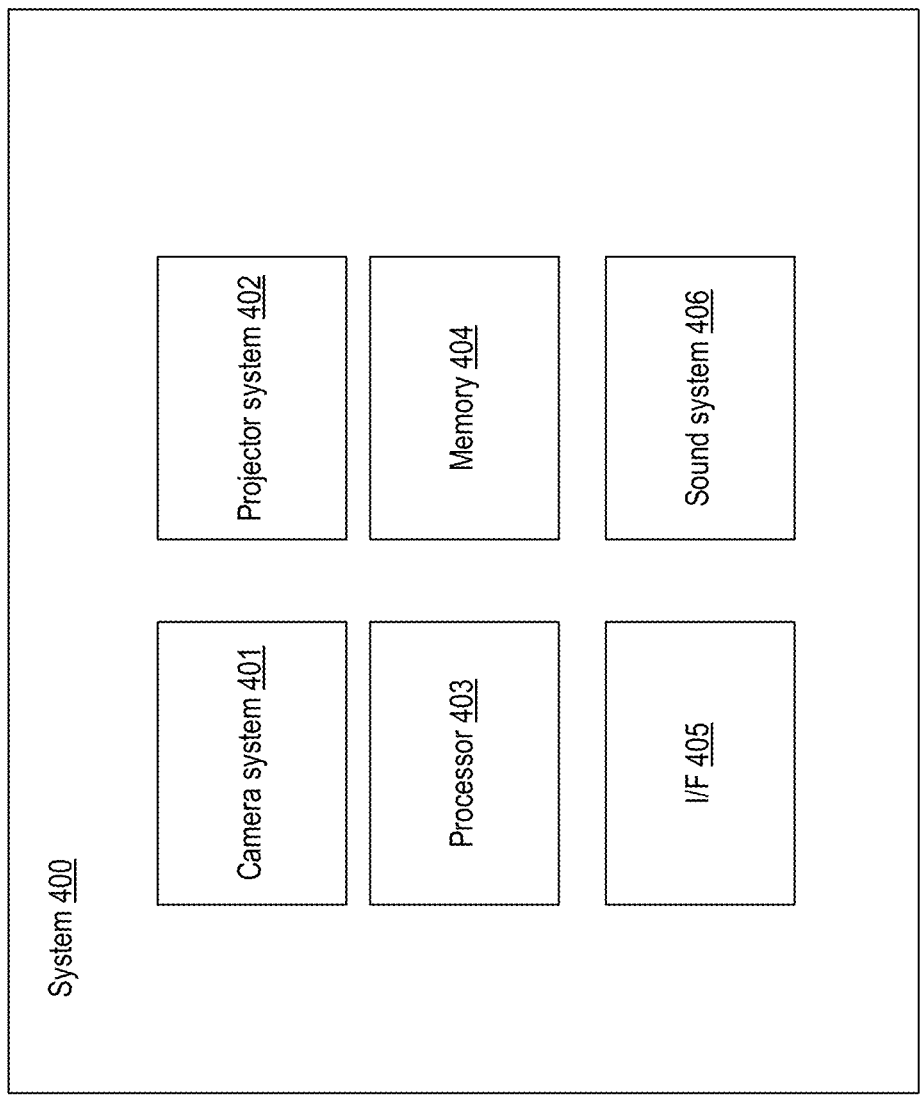
FIG. 4(a) illustrates a system for monitoring a particular environment, in accordance with an example implementation.

FIG. 4(a) illustrates a system for monitoring a particular environment, in accordance with an example implementation. System 400 can include a camera system 401, processor 403, memory 404, and network interface (I/F) 405. Depending on the desired implementation, system 400 can optionally include projector system 402 and/or sound system 406. In example implementations, system 400 can be configured to be implemented in any environment setting to be monitored, such as an office space, an enclosed workbooth, a conference room, and so on in accordance with the desired implementation. Camera system 401 can include one or more cameras to facilitate the example implementations described herein. Any camera known in the art can be utilized to facilitate the functionality of camera system 401, such as, but not limited to, a Red-Green-Blue (RGB) camera. Processor 403 can include one or more physical hardware processors such as central processing units (CPU), or can be any combination of hardware and software processors. Network I/F 405 facilitates connections and exchange of data between the system and a management apparatus as illustrated in FIG. 5.

In example implementations as will be described herein, there can also be a projector system 402 configured to project light to highlight anomalies in the environment. Projector system 402 can include any type of projector known in the art to project light to facilitate such an implementation. For example, when a user of the environment leaves the room, the projector can project light to highlight detected anomalies in the room to indicate to the user that an object has been left behind. Depending on the desired implementation, sound system 406 can provide audio cues to indicate to the user that there is an anomalous object in the environment. Sound system 406 can include one or more speakers to facilitate the desired audio cue, and can be any type of speaker known to one of ordinary skill in the art. Through such example implementations, users exiting the environment can thereby be warned of potential objects that have been left behind in the environment.

Figure 5:
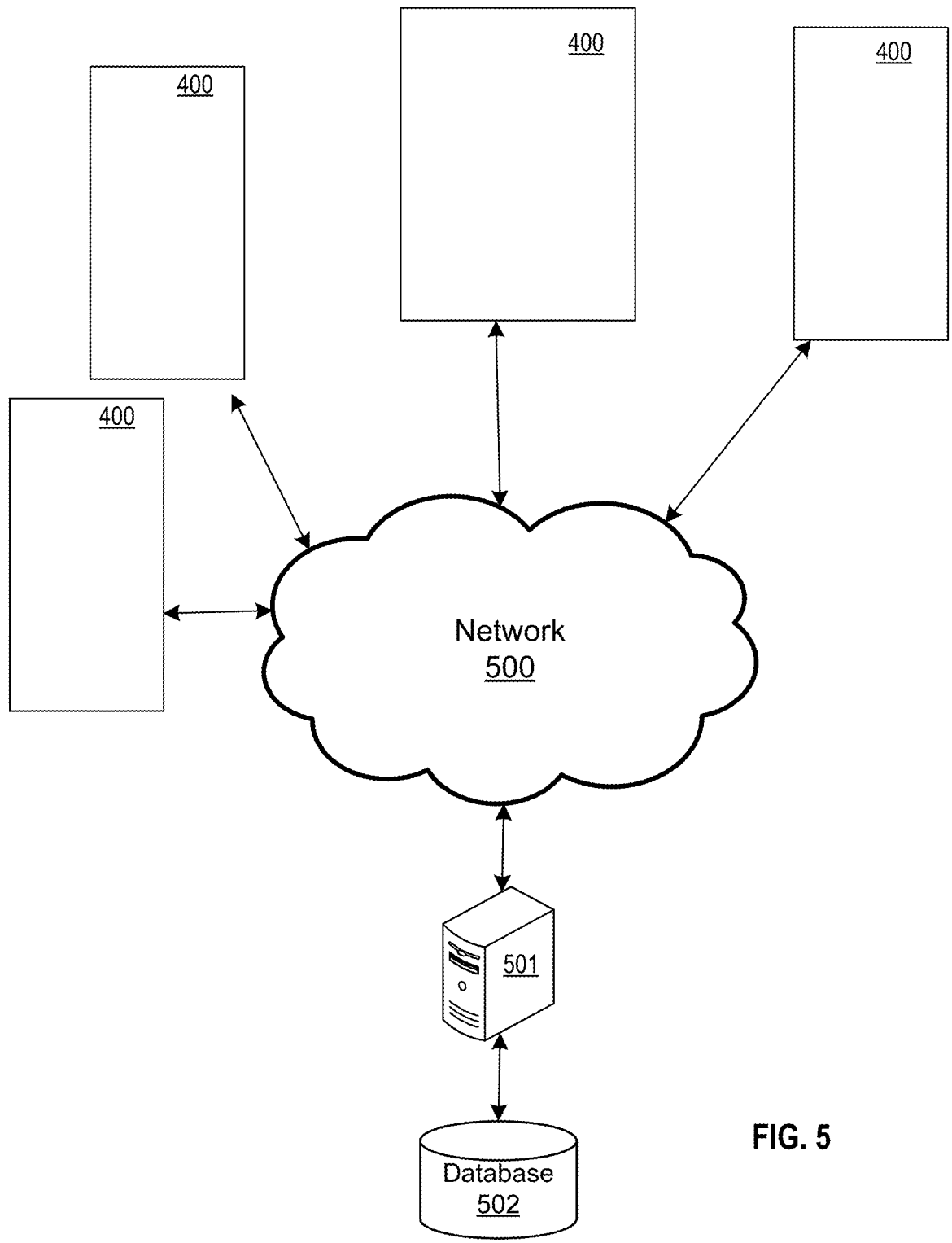
FIG. 5 illustrates a system involving a management apparatus managing a plurality of systems in accordance with an example implementation.
Figure 8:
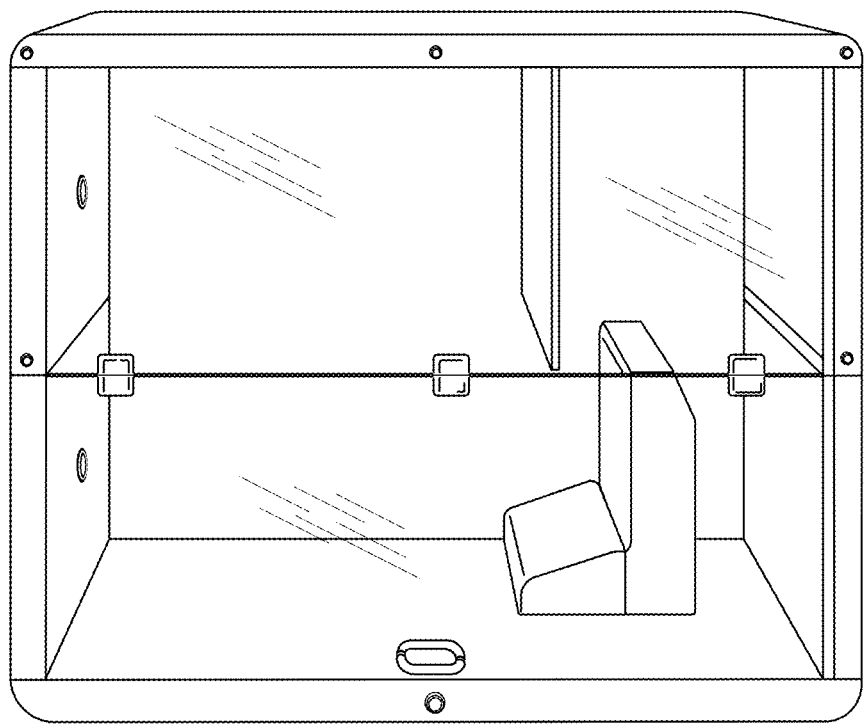
FIG. 8 illustrates an example of a workbooth, in accordance with an example implementation.

Depending on the desired implementation, the system 400 as illustrated in FIG. 4(a) can operate as a standalone system, or as a part of a network of multiple systems managed by a management apparatus as illustrated in FIG. 5. In an example of a standalone system, the system 400 is installed into an environment such as a workbooth as illustrated in FIG. 8.

Figure 7C:
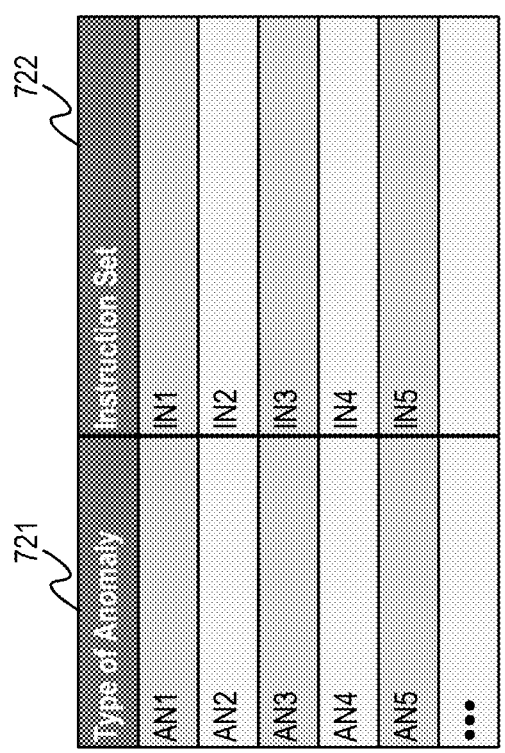

In an example of a standalone system, memory 404 is configured to store management information as illustrated in FIGS. 7(a) to 7(c). Processor 403 can be configured to conduct anomaly detection on one or more images received from the camera system 401, based on a matching of one or more regions of interest extracted from foreground segmentation conducted on the one or more images with one or more detected objects extracted from object detection conducted on the one or more images as illustrated in FIGS. 1, 120, 130, and 140; and for the anomaly detection indicating a detection of an anomaly as illustrated in FIG. 1 at 150 and at FIG. 2, execute anomaly handling instructions based on the anomaly by executing an instruction set according to the type of anomaly as illustrated in FIG. 7(c).

In such an example of anomaly handling instructions, the type of anomaly is determined based on the anomaly classification as illustrated in FIG. 2, whereupon it is determined if the anomaly is additive (e.g., object has been added to the environment) or subtractive (e.g., expected object as determined from the list from FIG. 7(a) based on the system ID or environment) and the associated object. For example, if the anomaly classification is additive, indicating the detection of an object added to the environment, processor 403 can be configured to transmit a message to a user associated with the environment regarding the object added to the environment through identifying the user from the schedule information of FIG. 7(b) and transmitting a copy of the image of the anomalous object along with a preset message based on the contact information associated with the user. Such contact information can involve, but is not limited to, electronic mail, SMS or text messaging, and so on in accordance with an example implementation.

In an example implementation, the system and the associated environment are associated in FIG. 7(a). Processor 403 can be configured to execute the processes as illustrated in FIG. 1 and FIG. 2, to conduct anomaly detection on the one or more images from the camera system 401. If at least one of the one or more expected objects is not detected from the matching of the one or more regions of interest with the object detection as illustrated in FIGS. 1 and 2, processor 403 can indicate the detection of the anomaly through an indication indicative of the at least one of the one or more expected objects being removed from the environment. Such an indication can include, but is not limited to, transmitting a message to an administrator that indicates the missing object, raising an alert, providing a message to the user to move the object within the environment, and so on, in accordance with the desired implementation. For an additive anomaly (e.g., a detection of an object that is not in the one or more expected objects associated with the environment), processor 403 can be configured to indicate the detection of the anomaly through an indication indicative of the object being added to the environment. Such an indication can include highlighting the anomaly in the images as illustrated in FIG. 3(a), transmitting a message to the user, transmitting a message to the administrator or janitorial services depending on the type of identified object, and so on in accordance with the desired implementation.

In another example implementation for detection of an additive anomaly, processor 403 can be configured to engage the projector system 402 to project onto the object added to the environment. Based on the location of the detected object in the image as illustrated in FIG. 3(a), projector system 402 is controlled by processor 403 to project light onto the object within the environment. In another example implementation, projector system 402 can be controlled by processor 403 to project a message on the exit of the environment (e.g., the door of the conference room or workbooth, etc.) to inform the user of the object. In another example implementation, processor 403 can engage sound system 406 to provide an audio cue to inform the user of the object in accordance with the desired implementation.

In an example implementation, the system and the associated environment is associated with one or more expected objects as illustrated in FIG. 7(a). In such an example implementation in which the anomaly detection is subtractive (e.g., at least one of the one or more expected objects not detected from the process of FIG. 1 and FIG. 2 or the at least one of the expected objects is missing from the environment), processor 403 can involve instructions such as transmitting an alert. The alert can be in the form of sending a message to the administrator or security to review the environment, to provide an audio cue on the sound system 406, or through other methods in accordance with the desired implementation.

Figure 4B:
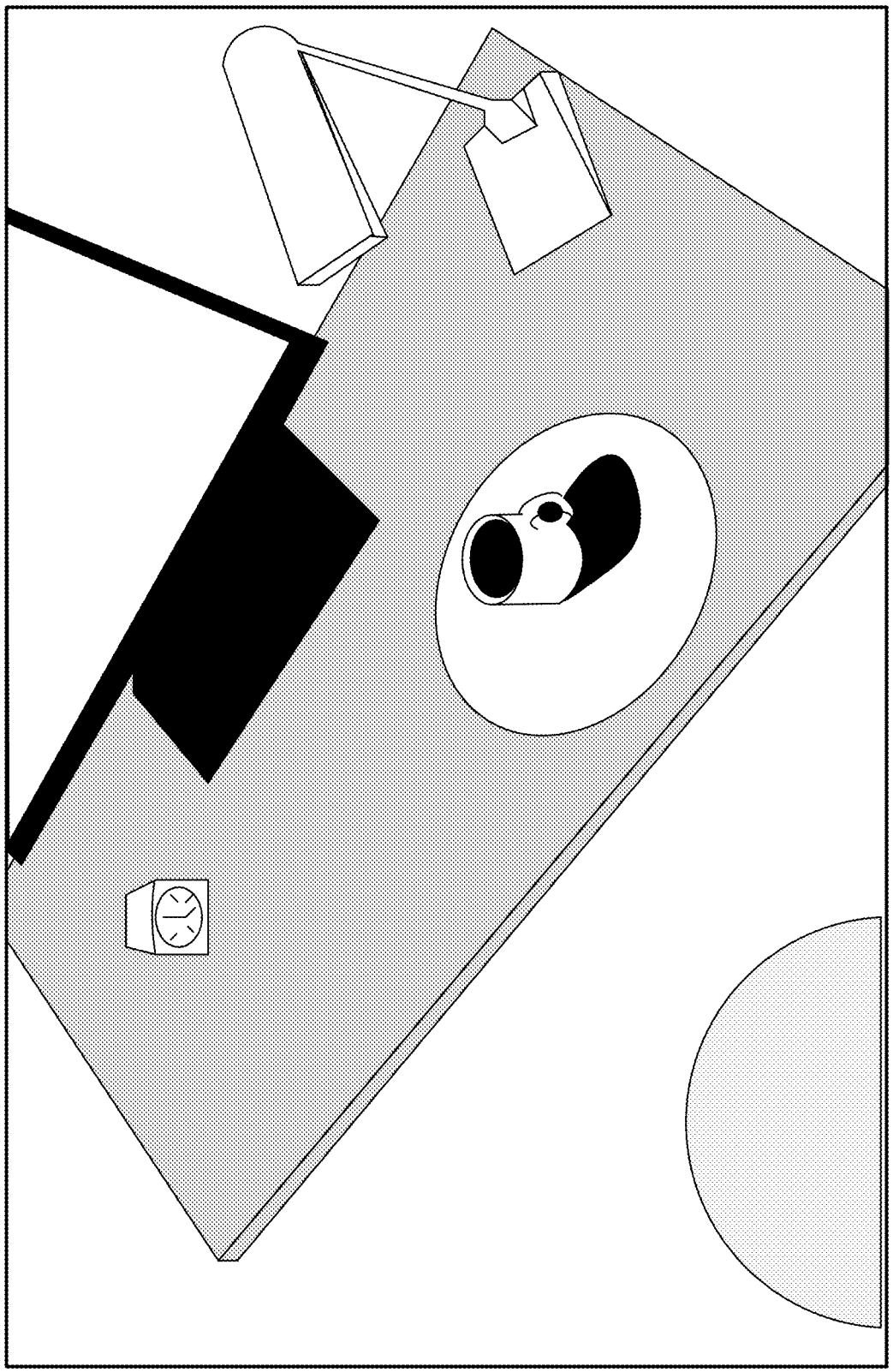
FIG. 4(b) illustrates an example implementation involving a projector.

FIG. 4(b) illustrates an example implementation involving a projector. As illustrated in the example of FIG. 4(b), projector system 402 is controlled by processor 403 to project light onto a detected additive anomaly. In the example of FIG. 4(b), a coffee mug was left behind by a previous user of the environment. When the user is no longer detected by the camera system 401, then projector system 402 projects light onto the detected additive anomaly (the coffee cup in the example of FIG. 4(b)) to alert the user that an item has been left behind.

FIG. 5 illustrates a system involving a management apparatus managing a plurality of systems in accordance with an example implementation. One or more anomaly detection systems 400 as illustrated in FIG. 4 are communicatively coupled to a network 500 through network OF 405 and to a management apparatus 501. The management apparatus 501 manages a database 502, which can include data such as feature vectors of previous detections 200, a library of objects for object classification, and other management information to manage the environments monitored by the plurality of systems. In example implementations, data from the anomaly detection systems 400 can be stored to a central repository or central database such as proprietary databases that data from equipment or equipment systems such as enterprise resource planning systems, and the management apparatus 501 can access or retrieve the data from the central repository or central database.

Figure 6:
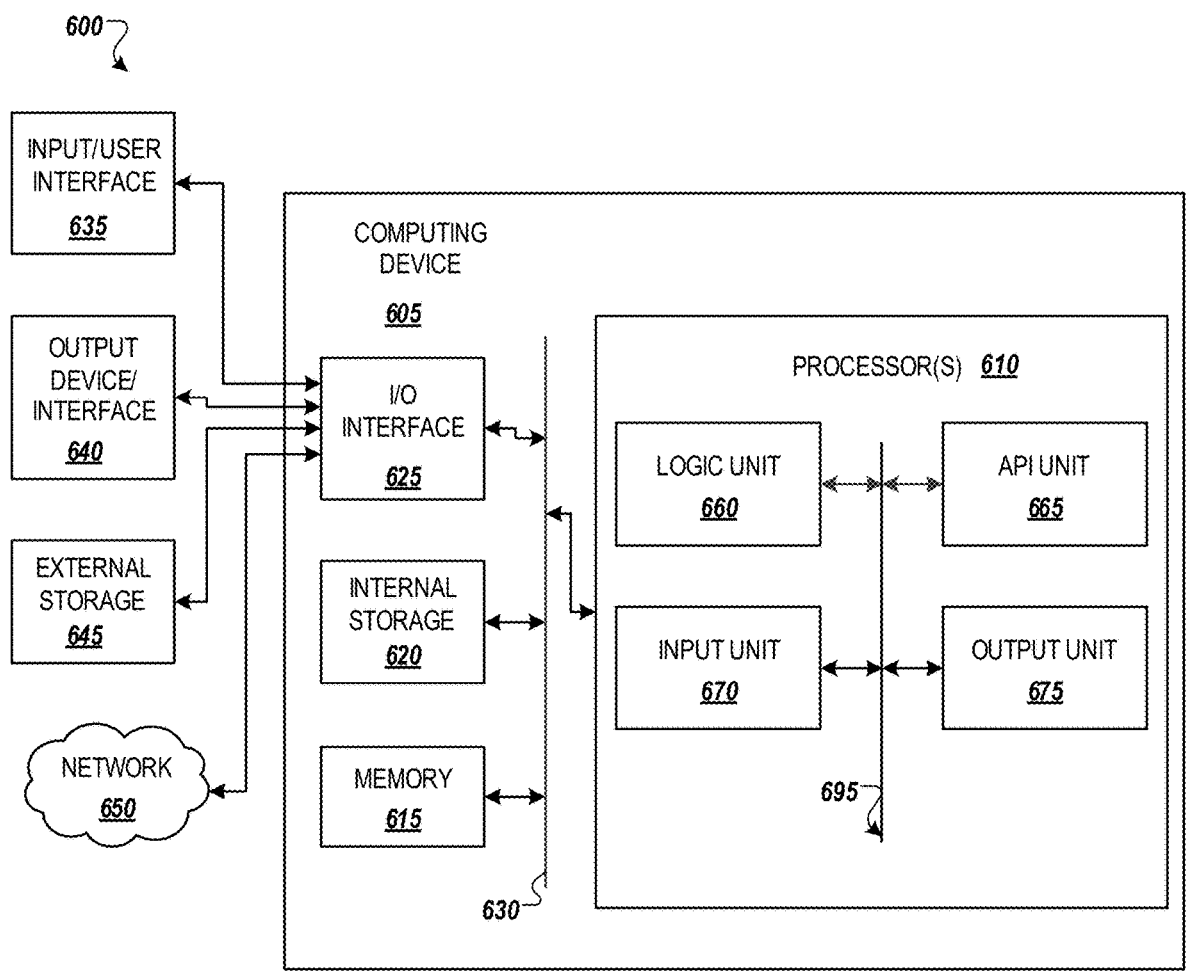
FIG. 6 illustrates an example computing environment with an example computer device suitable for use in some example implementations.

FIG. 6 illustrates an example computing environment with an example computer device suitable for use in some example implementations, such as a management apparatus 501 as illustrated in FIG. 5. Computer device 605 in computing environment 600 can include one or more processing units, cores, or processors 610, memory 615 (e.g., RAM, ROM, and/or the like), internal storage 620 (e.g., magnetic, optical, solid state storage, and/or organic), and/or I/O interface 625, any of which can be coupled on a communication mechanism or bus 630 for communicating information or embedded in the computer device 605. I/O interface 625 is also configured to receive images from cameras or provide images to projectors or displays, depending on the desired implementation.

Computer device 605 can be communicatively coupled to input/user interface 635 and output device/interface 640. Either one or both of input/user interface 635 and output device/interface 640 can be a wired or wireless interface and can be detachable. Input/user interface 635 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 640 may include a display, television, monitor, printer, speaker, braille, or the like. In some example implementations, input/user interface 635 and output device/interface 640 can be embedded with or physically coupled to the computer device 605. In other example implementations, other computer devices may function as or provide the functions of input/user interface 635 and output device/interface 640 for a computer device 605.

Examples of computer device 605 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 605 can be communicatively coupled (e.g., via I/O interface 625) to external storage 645 and network 650 for communicating with any number of networked components, devices, and systems, including one or more computer devices of the same or different configuration. Computer device 605 or any connected computer device can be functioning as, providing services of, or referred to as a server, client, thin server, general machine, special-purpose machine, or another label.

I/O interface 625 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 600. Network 650 can be any network or combination of networks (e.g., the Internet, local area network, wide area network, a telephonic network, a cellular network, satellite network, and the like).

Computer device 605 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 605 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 610 can execute under any operating system (OS) (not shown), in a native or virtual environment. One or more applications can be deployed that include logic unit 660, application programming interface (API) unit 665, input unit 670, output unit 675, and inter-unit communication mechanism 695 for the different units to communicate with each other, with the OS, and with other applications (not shown). The described units and elements can be varied in design, function, configuration, or implementation and are not limited to the descriptions provided. Processor(s) 610 can be in the form of hardware processors such as central processing units (CPUs) or in a combination of hardware and software units.

In some example implementations, when information or an execution instruction is received by API unit 665, it may be communicated to one or more other units (e.g., logic unit 660, input unit 670, output unit 675). In some instances, logic unit 660 may be configured to control the information flow among the units and direct the services provided by API unit 665, input unit 670, output unit 675, in some example implementations described above. For example, the flow of one or more processes or implementations may be controlled by logic unit 660 alone or in conjunction with API unit 665. The input unit 670 may be configured to obtain input for the calculations described in the example implementations, and the output unit 675 may be configured to provide output based on the calculations described in example implementations.

In an example implementation of a management apparatus as illustrated in FIG. 5, the management apparatus 501 manages a plurality of systems 400 as illustrated in FIG. 4, thereby managing a plurality of environments. In such an example implementation, database 502 or memory 615 can be configured to store the management information as illustrated in FIGS. 7(a) to 7(c). Each of the plurality of systems 400 is configured to provide the one or more images from their respective camera systems 401 to the management apparatus 501 through network I/F 405.

Processor 610 can be configured to conduct anomaly detection on one or more images received from a respective system 400, based on a matching of one or more regions of interest extracted from foreground segmentation conducted on the one or more images with one or more detected objects extracted from object detection conducted on the one or more images as illustrated in FIGS. 1, 120, 130, and 140; and for the anomaly detection indicating a detection of an anomaly as illustrated in FIG. 1 at 150 and at FIG. 2, execute anomaly handling instructions based on the anomaly by executing an instruction set according to the type of anomaly as illustrated in FIG. 7(c).

In such an example of anomaly handling instructions, the type of anomaly is determined based on the anomaly classification as illustrated in FIG. 2, whereupon it is determined if the anomaly is additive (e.g., object has been added to the environment) or subtractive (e.g., expected object as determined from the list from FIG. 7(a) based on the system ID or environment) and the associated object. For example, if the anomaly classification is additive, indicating the detection of an object added to the environment, processor 403 can be configured to transmit a message to a user associated with the environment regarding the object added to the environment through identifying the user from the schedule information of FIG. 7(b) and transmitting a copy of the image of the anomalous object along with a preset message based on the contact information associated with the user. Such contact information can involve, but is not limited to, electronic mail, SMS or text messaging, and so on in accordance with an example implementation.

In an example implementation, the system 400 and the associated environment are associated in FIG. 7(a). Processor 610 can be configured to execute the processes as illustrated in FIG. 1 and FIG. 2, to conduct anomaly detection on the one or more images from the system 400. If at least one of the one or more expected objects is not detected from the matching of the one or more regions of interest with the object detection as illustrated in FIGS. 1 and 2, processor 610 can indicate the detection of the anomaly through an indication indicative of the at least one of the one or more expected objects being removed from the environment. Such an indication can include, but is not limited to, transmitting a message to an administrator that indicates the missing object, raising an alert, providing a message to the user to move the object within the environment, and so on, in accordance with the desired implementation. For an additive anomaly (e.g., a detection of an object that is not in the one or more expected objects associated with the environment), processor 403 can be configured to indicate the detection of the anomaly through an indication indicative of the object being added to the environment. Such an indication can include highlighting the anomaly in the images as illustrated in FIG. 3(a), transmitting a message to the user, transmitting a message to the administrator or janitorial services depending on the type of identified object, and so on in accordance with the desired implementation.

In another example implementation for detection of an additive anomaly, processor 610 can be configured to transmit instructions to the respective system 400 to engage its corresponding projector system 402 to project onto the object added to the environment. Based on the location of the detected object in the image as illustrated in FIG. 3(a), projector system 402 is thereby controlled by processor 403 to project light onto the object within the environment as described with respect to FIG. 4.

In an example implementation, the system and the associated environment is associated with one or more expected objects as illustrated in FIG. 7(a). In such an example implementation in which the anomaly detection is subtractive (e.g., at least one of the one or more expected objects not detected from the process of FIG. 1 and FIG. 2 or the at least one of the expected objects is missing from the environment), Processor 610 can involve instructions such as transmitting an alert. The alert can be in the form of sending a message to the administrator or security to review the environment, to provide an audio cue on the sound system 406, or through other methods in accordance with the desired implementation.

FIGS. 7(a) to 7(c) illustrate examples of management information that can be utilized to facilitate the example implementations described herein. Specifically, FIG. 7(a) illustrates management information for a plurality of systems 400 as illustrated in FIG. 5. Each system 400 can be associated with a system identifier (ID) 701, expected objects 702, a schedule or log for the system 703, and anomaly handling procedure 704. System ID 701 provides a unique identifier to the system and the environment associated with the system. Expected objects 702 are a list of objects that are expected to be in the environment. Such a list can be defined by the user/administrator, or can be detected from the anomaly detection in accordance with the desired implementation. Schedule/Log 703 can indicate a log of interactions or a schedule of users expected to be in the environment, depending on the desired implementation. Anomaly handling procedure 704 includes the procedures to conduct anomaly handling based on the detection of anomalies.

FIG. 7(*b*) illustrates an example of schedule/log 703. The schedule/log 703 manages interactions or scheduled interactions that are to occur for environments such as workbooths, rental/temporary offices, conference rooms, and so on. In the example of FIG. 7(*b*), there can be user ID 711, the time entered/scheduled 712 and the contact information 713. User ID 711 is a unique identifier assigned to a user that is to interact with the environment. Time entered/scheduled 712 indicates the schedule of user(s) that are expected to enter or have entered the environment at a given time. Contact information 713 can include the contact information of the user.

FIG. 7(*c*) illustrates an example of anomaly handling procedure 704. Each system can have associated handling for a type of anomaly 721 and can execute an instruction set 722 for detecting the associated type of anomaly. Type of anomaly 721 can indicate the type of anomaly, and can include the information as to whether it is an additive or subtractive, and the associated object (if applicable). Instruction set 722 can include the set of instructions to be executed by system 400 based on the detection of the anomaly.

In example implementations described herein, the instruction set can be configured to send notifications to either the user indicated in the contact information 713 of FIG. 7(*b*), or to the administrator or security department of the system depending on the type of anomaly detected. In such example implementations, notifications are transmitted depending on the underlying object and the type of anomaly. For example, if the anomaly is subtractive for an expected object/equipment in the environment, the instruction set can include alerting security and forwarding the contact information of the user scheduled or detected in the environment to security. Such a notification can be conducted through any desired implementation, including SMS message, e-mail message, and so on.

In an example implementation of transmitting a notification to the user, if the anomaly is additive and the underlying object involves an object belonging to the user (e.g., keys, a cell phone etc.), the underlying instruction set can include activating the projector to highlight the object and/or audio cues from the sound speaker if the user is starting to leave (e.g., as detected from the door of the office opening or through other desired methods). In another example implementation, such an instruction set can also include contacting the user and forwarding an image of the detected object to inform the user that an object has been left behind in the environment.

Thus, anomaly handling can be adjusted to facilitate the desired implementation and transmit a notification in accordance with the desired implementation, and the present disclosure is not limited thereto by the above examples.

FIG. 8 illustrates an example of a workbooth, in accordance with an example implementation. As illustrated in FIG. 8, a workbooth is an enclosed workspace that can be disposed within a conference room, a train station, or other public area and is available for access by a user. Access to the workbooth can be controlled by a door and a lock, which is controlled to be accessible by a user at a scheduled time and/or with correct authentication (e.g., by keycard, by mobile application, etc.). A workbooth can have installed therein a chair, a desk, a wireless or cellular connection, lighting and otherwise in accordance with the desired implementation. Depending on the desired implementation, the workbooth can also include equipment for access, such as a monitor, a computer, a keyboard, a mouse, and so on. In example implementations, the equipment is incorporated into the list of objects associated with the workbooth, and the system such as the one illustrated in FIG. 4 is installed within the workbooth to monitor for anomalies.

Although FIG. 8 illustrates a workbooth, other environments may be utilized in accordance with the desired implementation, and the present disclosure is not limited thereto. Such examples of environments can include offices, conference rooms, shared areas, lounges, and so on.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A non-transitory computer readable medium, storing instructions for executing a process, the instructions comprising:
    extracting one or more regions of interest from foreground segmentation conducted on a plurality of images received from a system associated with an environment, the one or more regions of interest indicating a location of a candidate anomaly, the environment comprising a plurality of objects;
    extracting one or more bounding boxes from objection detection conducted on the plurality of images, the objection detection trained to detect, from the plurality of images, objects known to be comprised in the environment and extract the one or more bounding boxes indicating locations of the detected objects;
    conducting anomaly detection on the plurality of images based on a matching of the one or more regions of interest extracted from foreground segmentation with the one or more bounding boxes extracted from object detection;
    for each region of interest that overlaps with a bounding box, classifying each object related to each region of interest as a known object;
    detecting an additive anomaly when a region of interest does not overlap with any of the one or more bounding boxes, wherein detecting the additive anomaly is indicative that the object related to the region of interest is an unknown object added to the environment;
    detecting a subtractive anomaly when an object is classified as a known object in a first image of the plurality of images and the object is not detected in a second image of the plurality of images, subsequent to the first image, wherein detecting the subtractive anomaly is indicative that the object classified as a known object has been removed from the environment; and
    for the anomaly detection detecting one or more of an additive anomaly and a subtractive anomaly, executing anomaly handling instructions based on the one or more of an additive anomaly and a subtractive anomaly.

2. The non-transitory computer readable medium of claim 1, wherein the environment is associated with one or more expected objects, wherein conducting anomaly detection on the one or more images received from the system comprises:
    for at least one of the one or more expected objects not being detected from the matching of the one or more regions of interest with the object detection, indicating the detection of the anomaly through a first indication indicative of the at least one of the one or more expected objects being removed from the environment; and
    for an object detected from the matching that is not in the one or more expected objects associated with the environment, indicating the detection of the anomaly through a second indication indicative of the object being added to the environment.

3. The non-transitory computer readable medium of claim 1, wherein the anomaly comprises detecting an object added to the environment, and wherein the anomaly handling instructions comprises transmitting a message to a user associated with the environment regarding the object added to the environment.

4. The non-transitory computer readable medium of claim 1, wherein the anomaly comprises detecting an object added to the environment, and wherein the anomaly handling instructions comprises transmitting instructions to the system to engage a projector system to project light onto the object added to the environment.

5. The non-transitory computer readable medium of claim 1, wherein the anomaly comprises detecting an object missing from the environment, and wherein the anomaly handling instructions comprises transmitting an alert.

6. The non-transitory computer readable medium of claim 1, wherein the environment is a workbooth.

7. A management apparatus, configured to manage a plurality of systems over a network, each of the plurality of systems associated with an environment, the management apparatus comprising:
    a processor, configured to:
        extract one or more regions of interest from foreground segmentation conducted on a plurality of images received from a system associated with an environment, the one or more regions of interest indicating a location of a candidate anomaly, the environment comprising a plurality of objects;
        extract one or more bounding boxes from objection detection conducted on the plurality of images, the objection detection trained to detect, from the plurality of images, objects known to be comprised in the environment and extract the one or more bounding boxes indicating locations of the detected objects;
        conduct anomaly detection on the plurality of images based on a matching of the one or more regions of interest extracted from foreground segmentation with the one or more bounding boxes extracted from object detection;
        for each region of interest that overlaps with a bounding box, classify each object related to each region of interest as a known object;
        detect an additive anomaly when a region of interest does not overlap with any of the one or more bounding boxes, wherein detecting the additive anomaly is indicative that the object related to the region of interest is an unknown object added to the environment;

detect a subtractive anomaly when an object is classified as a known object in a first image of the plurality of images and the object is not detected in a second image of the plurality of images, subsequent to the first image, wherein detecting the subtractive anomaly is indicative that the object classified as a known object has been removed from the environment; and for the anomaly detection detecting one or more of an additive anomaly and a subtractive anomaly, execute anomaly handling instructions based on the one or more of an additive anomaly and a subtractive anomaly.

8. The management apparatus of claim 7, wherein the environment is associated with one or more expected objects, wherein the processor is configured to conduct anomaly detection on the one or more images received from the system by:

for at least one of the one or more expected objects not being detected from the matching of the one or more regions of interest with the object detection, indicating the detection of the anomaly through a first indication indicative of the at least one of the one or more expected objects being removed from the environment; and for an object detected from the matching that is not in the one or more expected objects associated with the environment, indicating the detection of the anomaly through a second indication indicative of the object being added to the environment.

9. The management apparatus of claim 7, wherein the anomaly comprises detecting an object added to the environment, and wherein the anomaly handling instructions comprises transmitting a message to a user associated with the environment regarding the object added to the environment.

10. The management apparatus of claim 7, wherein the anomaly comprises detecting an object added to the environment, and wherein the anomaly handling instructions comprises transmitting instructions to the system to engage a projector system to project light onto the object added to the environment.

11. The management apparatus of claim 7, wherein the anomaly comprises detecting an object missing from the environment, and wherein the anomaly handling instructions comprises transmitting an alert.

12. The management apparatus of claim 7, wherein the environment is a workbooth.

13. A system associated with an environment, the system comprising:

a camera system; and a processor, configured to:

extract one or more regions of interest from foreground segmentation conducted on a plurality of images received from a system associated with an environment, the one or more regions of interest indicating a location of a candidate anomaly, the environment comprising a plurality of objects;

extract one or more bounding boxes from objection detection conducted on the plurality of images, the objection detection trained to detect, from the plurality of images, objects known to be comprised in the environment and extract the one or more bounding boxes indicating locations of the detected objects;

conduct anomaly detection on the plurality of images based on a matching of the one or more regions of interest extracted from foreground segmentation with the one or more bounding boxes extracted from object detection;

for each region of interest that overlaps with a bounding box, classify each object related to each region of interest as a known object;

detect an additive anomaly when a region of interest does not overlap with any of the one or more bounding boxes, wherein detecting the additive anomaly is indicative that the object related to the region of interest is an unknown object added to the environment;

detect a subtractive anomaly when an object is classified as a known object in a first image of the plurality of images and the object is not detected in a second image of the plurality of images, subsequent to the first image, wherein detecting the subtractive anomaly is indicative that the object classified as a known object has been removed from the environment; and for the anomaly detection detecting one or more of an additive anomaly and a subtractive anomaly, execute anomaly handling instructions based on the one or more of an additive anomaly and a subtractive anomaly.

14. The system of claim 13, wherein the environment is associated with one or more expected objects, wherein the processor is configured to conduct anomaly detection on the one or more images received from the system by:

for at least one of the one or more expected objects not being detected from the matching of the one or more regions of interest with the object detection, indicating the detection of the anomaly through a first indication indicative of the at least one of the one or more expected objects being removed from the environment; and for an object detected from the matching that is not in the one or more expected objects associated with the environment, indicating the detection of the anomaly through a second indication indicative of the object being added to the environment.

15. The system of claim 13, wherein the anomaly comprises detecting an object added to the environment, and wherein the anomaly handling instructions comprises transmitting a message to a user associated with the environment regarding the object added to the environment.

16. The system of claim 13, the system further comprising a projector system, wherein the anomaly comprises detecting an object added to the environment, and wherein the anomaly handling instructions comprises engaging the projector system to project light onto the object added to the environment.

17. The system of claim 13, wherein the anomaly comprises detecting an object missing from the environment, and wherein the anomaly handling instructions comprises transmitting an alert.

18. The system of claim 13, wherein the environment is a workbooth.

* * * * *